United States Patent [19]

Shaw

[11] 4,419,238

[45] Dec. 6, 1983

[54] JUICE DRAINER

[75] Inventor: Philip L. Shaw, Victoria, Australia

[73] Assignee: Lindeman (Holdings) Limited, New South Wales, Australia

[21] Appl. No.: 394,572

[22] Filed: Jul. 2, 1982

Related U.S. Application Data

[63] Continuation of Ser. No. 194,716, Oct. 7, 1980, abandoned, which is a continuation of Ser. No. 32,591, Apr. 23, 1979, abandoned.

[30] Foreign Application Priority Data

Apr. 24, 1978 [AU] Australia .............................. PD4152

[51] Int. Cl.³ .............................................. B01D 35/02

[52] U.S. Cl. .................................... 210/338; 210/405; 210/418; 210/446; 210/499; 99/508

[58] Field of Search ..................... 210/224, 225, 323.1, 210/332, 335, 338, 346, 405, 413, 414, 418, 419, 429, 446, 456, 457, 452, 499; 209/246, 262, 256, 258, 359, 458; 99/503, 507, 508, 513

[56] References Cited

U.S. PATENT DOCUMENTS

| | | | |
|---|---|---|---|
| 656,346 | 8/1900 | Dietz | 209/359 |
| 959,581 | 5/1910 | Newton | 99/513 |
| 1,199,350 | 9/1916 | Collins | 210/457 X |
| 1,220,232 | 3/1917 | Jackson | 210/499 X |
| 1,477,986 | 12/1923 | Thoens | 210/499 X |
| 2,449,582 | 9/1948 | Brusset | 209/468 |
| 3,719,276 | 3/1973 | Allen | 209/256 X |
| 3,782,555 | 1/1974 | Solom | 210/456 X |
| 3,997,441 | 12/1976 | Pamplin, Jr. | 210/458 X |
| 4,085,050 | 4/1978 | Gedvasi | 210/414 X |
| 4,120,790 | 10/1978 | Tinker | 210/456 X |

*Primary Examiner*—John Adee
*Attorney, Agent, or Firm*—Ladas & Parry

[57] ABSTRACT

A juice extraction apparatus comprising a generally vertically extending structure having side walls defining a generally vertically extending enclosed space, a vertical passage extending through said space, at least a portion of said passage being defined by a screen so juice from crushed fruit located in said passage may drain therethrough, means to duct extracted juice from within said space, and means to regulate the flow of the crushed fruit through said passage.

5 Claims, 5 Drawing Figures

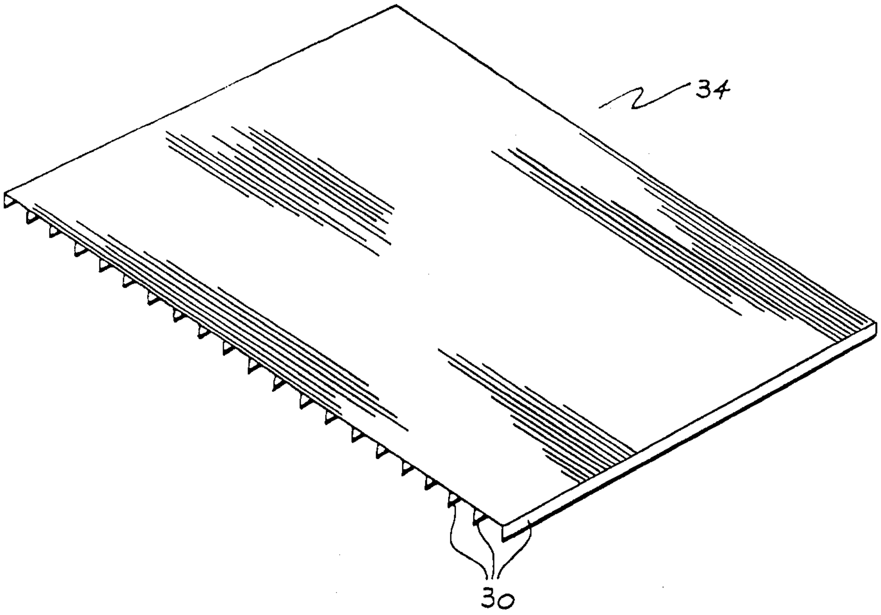
F/G. 4
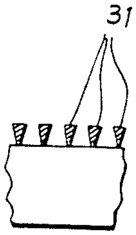
F/G. 5

JUICE DRAINER

This application is a continuation of application Ser. No. 194,716, filed Oct. 7, 1980, which application was itself a continuation of application Ser. No. 032,591, filed Apr. 23, 1979; both said applications are now abandoned.

The present invention relates to apparatus to drain juice from fruit and more particularly but not exclusively to apparatus to drain juice from crushed grapes.

In the extraction of juice from crushed grapes in particular it is desirable not to subject the grape pulp to any significant pressure difference as this would lead firstly to the rapid clogging of any filtering system while additionally the drained juice would contain undesirable levels of solid particles. Conventional apparatus, although operating efficiently to some degree in maintaining the concentration of solid particles in the extraction device below a certain level, do not operate in a continuous manner. Accordingly they are time consuming and therefore in this respect inefficient.

It is the object of the present invention to overcome or substantially ameliorate the above disadvantages.

There is disclosed herein a juice extraction apparatus comprising a generally vertically extending structure having side walls defining a generally vertically extending enclosed space, a vertical passage extending through said space, at least a portion of said passage being defined by a screen so juice from crushed fruit located in said passage may drain therethrough, means to duct extracted juice from within said space, and means to regulate the flow of the crushed fruit through said passage.

A preferred form of the present invention will now be described by way of example with reference to the accompanying drawings wherein:

FIG. 4 is a perspective schematic view of a screen to be used in the drainer of FIG. 1; and FIG. 5 shows a detail of FIG. 4.

Figure 1:
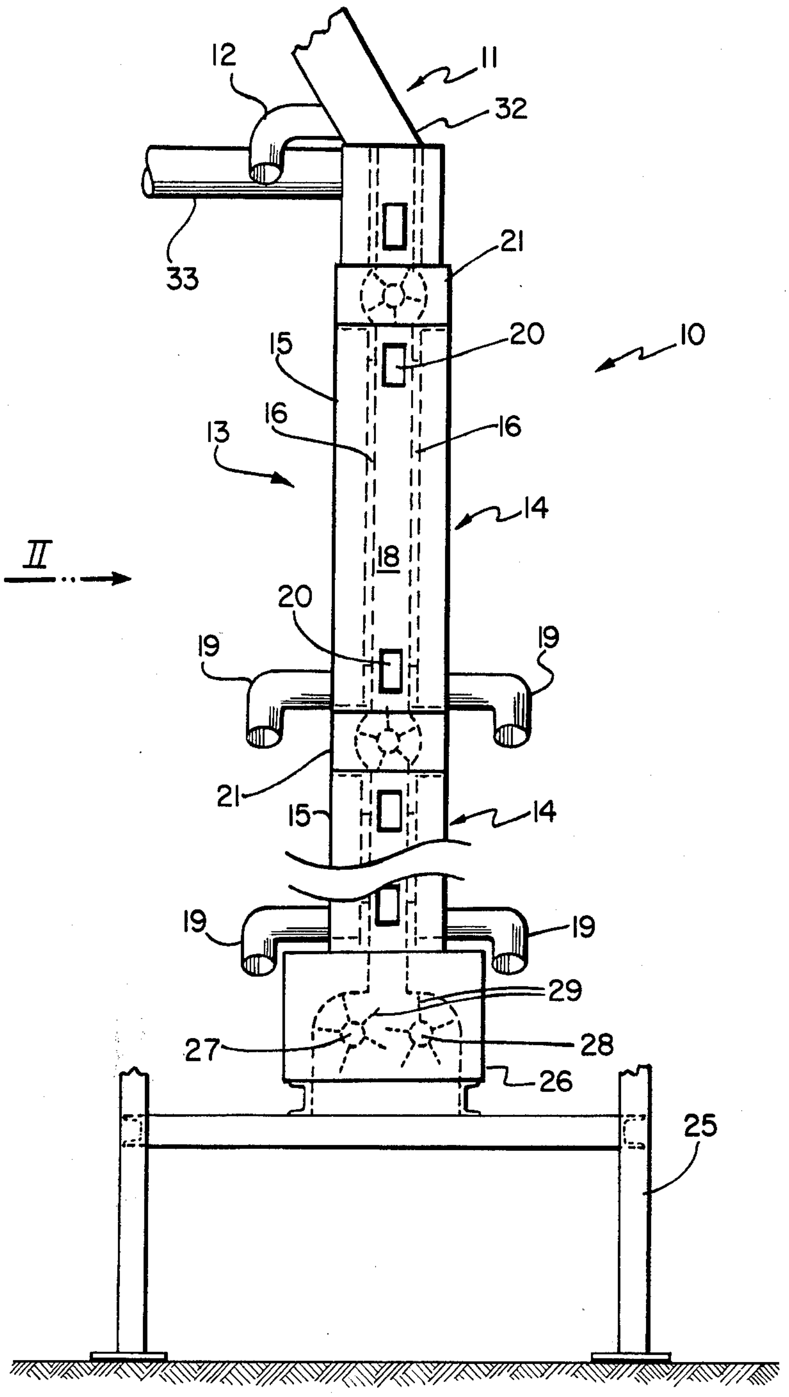
FIG. 1 is a schematic side elevation of a drainer adapted to drain juice from crushed grapes.
Figure 2:
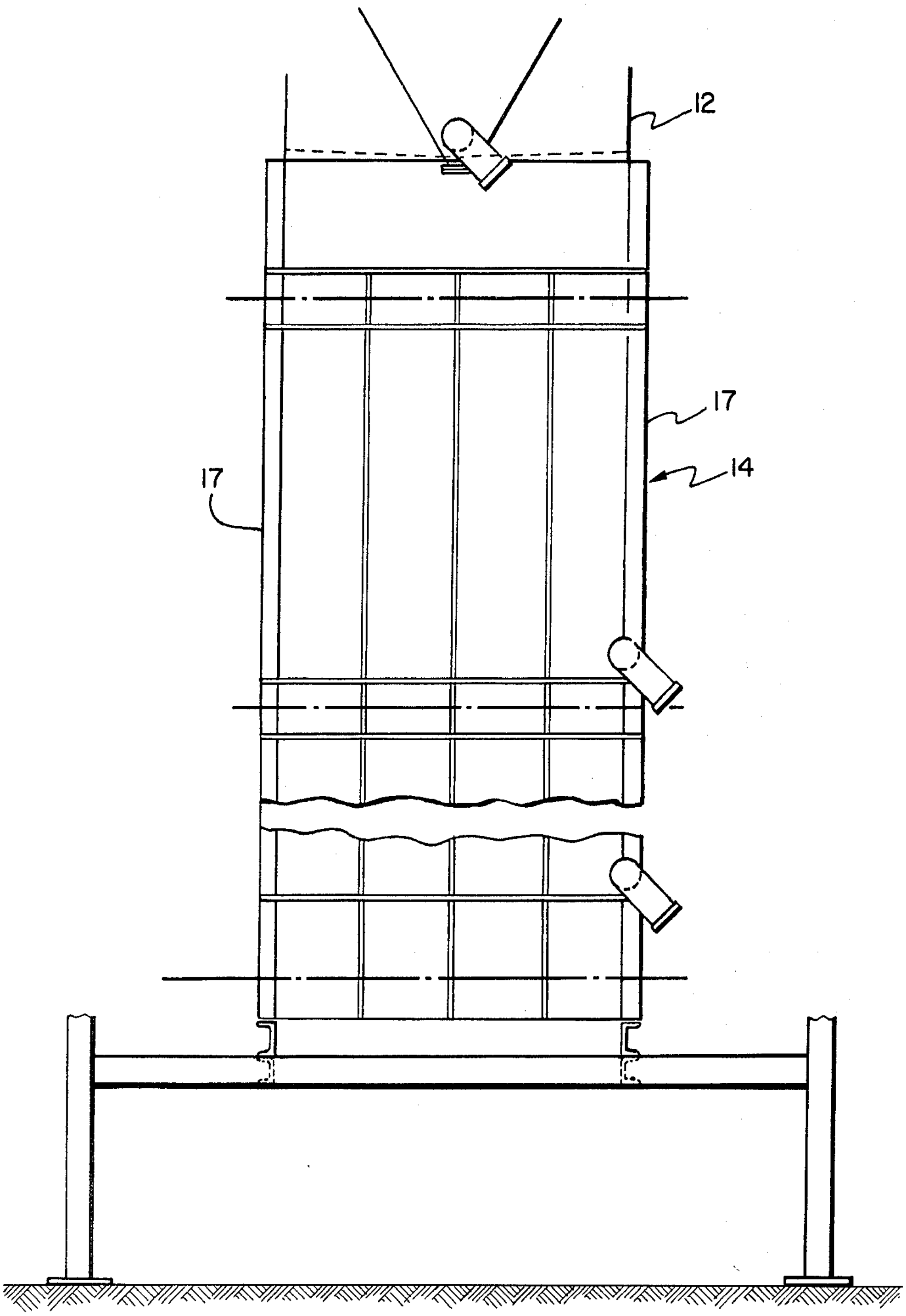
FIG. 2 is a schematic front elevation of the drainer of FIG. 1.

With reference to FIGS. 1 and 2 initially, the drainer 10 is adapted to drain juice from crushed grapes by moving the grapes past a series of screens under the influence of gravity in a generally continuous flow. The drainer 10 consists of several drainage units, the first is inclined unit 11 consisting of an outer casing 32 within which is located a screen not depicted. This unit 11 is also provided with a juice outlet 12 and an overflow 33 should the amount of crushed grapes entering the device 10 via unit 11 exceed a predetermined quantity per unit of time. The second unit is vertical unit 13 which consists of several vertically stacked sub-units 14. The overall vertical height of the unit 13 may be selected to a certain degree by increasing or decreasing the number of sub-units 14 in the stack. The sub-units 14 are substantially identical and each includes an outer casing 15 defining a sealed chamber within which is supported two generally vertical screens 16 which combine with end walls 17 to define a vertical duct 18 through which the crushed grapes pass. Located at the lower end of each sub-unit 14 are juice outlets 14, while the end walls 17 have inspected ports 20.

Figure 3:
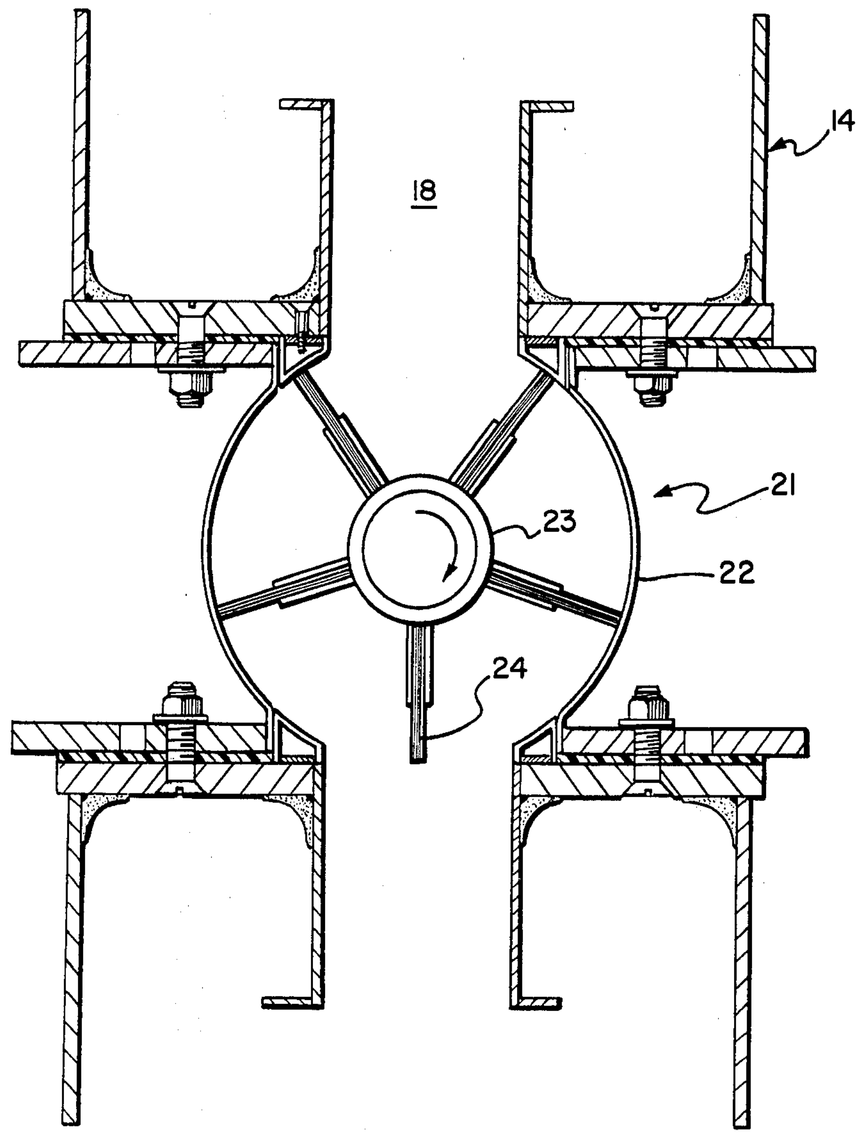
FIG. 3 is a schematic sectional view of a feed lock used in the drainer of FIG. 1.

To regulate the flow of crushed grapes through the device 10 there are provided feed locks 21. Each lock 21 is located at the upper part of each sub-unit 14 and is adapted to be power driven. The angular velocity of the locks 21 determines the rate of flow through the device 10, while in addition the locks 21 gently agitate and turn the crushed grapes to accelerate the drainage rate. Each lock 21 consists, as can be seen in FIG. 3, a casing 33 of two parts which encompass a centrally mounted shaft 23 from which radially extend a plurality of flexible vanes 24. The vanes 24 co-operate with the interior of the casing 21 to prevent the crushed grapes from passing around the vanes 24.

Located at the bottom of the unit 13 is a final exit lock 26 which allows the dry residue to leave the device 10. The lock 26, supported on a frame 25, includes two shafts 27 and 28 and interacting vanes 29.

The screens 16 used in the device 10 each comprise a plurality of screen panels 34 which have transverse supports 30 and screening elements 31 which extend generally vertically within the device 10. Each element 31 is of a dove-tail cross-section with the wider end located on the interior of duct 18. It should be appreciated that the device 10 is adaptable to extract juice from other fruits by changing the mesh size of the screen panels 34.

What I claim is:

1. A juice extraction apparatus for extracting juice from crushed grapes continuously passing through the apparatus, said apparatus comprising a generally vertically extending housing, a vertically extending screen located within the housing and dividing the interior of said housing into a vertical first passage to receive the crushed grapes and through which the grapes pass unhindered under the influence of gravity and a second passage to receive juice filtered from the grapes via said screen, an inlet at the top of said housing in communication with said first chamber to enable crushed grapes to be delivered to said first chamber, a juice outlet in said housing communicating with said second chamber to drain filtered juice therefrom, lock means terminating the lower end of said first passage to regulate the flow of crushed grapes through said first passage and wherein said lock means includes a casing with curved side walls, a driven shaft, a plurality of radial vanes extending from said shaft and co-operating with said casing to inhibit the movement of crushed fruit past the vanes, and drive means to continuously turn said shaft to regulate the flow of crushed grapes through said second passage.

2. The apparatus of claim 1 wherein said screen is formed by a plurality of vertically extending screening elements of a "dovetail" transverse cross-section with the cross-section diverging toward the interior of said second passage.

3. The apparatus of claim 1 wherein said second passage is of a generally rectangular transverse cross-section, and at least two of the side faces of said second passage are defined by the screens.

4. The apparatus of claim 2 wherein said second passage is of a generally rectangular transverse cross-section, and at least two of the side faces of said second passage are defined by the screens.

5. The apparatus of claim 1 wherein said vanes are straight and are of flexible material.

* * * * *